United States Patent [19]

Ceroke

[11] Patent Number: 4,986,502
[45] Date of Patent: Jan. 22, 1991

[54] SAFETY DRAIN PLUG

[76] Inventor: Clarence J. Ceroke, 4716 Magnolia Ave., Canton, Ohio 44705

[21] Appl. No.: 445,442

[22] Filed: Dec. 4, 1989

[51] Int. Cl.[5] .................. F16R 31/50; F16R 51/00
[52] U.S. Cl. .............................. 251/216; 251/217; 251/339; 251/351
[58] Field of Search ............... 251/215, 216, 217, 120, 251/121, 339, 351, 353, 205, 208

[56] References Cited

U.S. PATENT DOCUMENTS

| | | | |
|---|---|---|---|
| 171,304 | 12/1875 | Newton | 251/351 |
| 591,745 | 10/1897 | Dubrul | 251/216 |
| 688,631 | 12/1901 | Gledhill | 251/216 |
| 863,953 | 8/1907 | Tribbey | 251/216 |
| 1,143,700 | 6/1915 | Hamill | 251/121 |
| 1,168,866 | 1/1916 | Easter | 251/122 |
| 1,192,870 | 8/1916 | Daum | 251/216 |
| 1,299,571 | 4/1919 | Grounds | 251/216 |
| 1,347,951 | 7/1920 | Hohmann | 251/216 |
| 1,519,231 | 12/1924 | Benjamin | 251/216 |
| 2,488,456 | 11/1949 | Walker et al. | 251/217 |
| 3,422,679 | 1/1969 | McGowan et al. | 251/351 |
| 3,578,285 | 5/1971 | Carlton | 251/351 |
| 3,836,117 | 9/1974 | Panicali | 251/351 |
| 3,866,879 | 2/1975 | Elizond et al. | 251/216 |
| 3,910,572 | 10/1975 | Denler | 251/351 |
| 4,718,636 | 1/1988 | Briet | 251/216 |

FOREIGN PATENT DOCUMENTS 412031 9/1945 Italy ..................... 251/216

OTHER PUBLICATIONS

Nupro-Nupro Company, 4800 E. 345th St., Willoughby, OH 44094, Check and Relief Valves—pp. 1-8.

Primary Examiner—George L. Walton
Attorney, Agent, or Firm—Michael Sand Co.

[57] ABSTRACT

A drain plug for threaded engagement within a threaded drain opening of a pressurized system to prevent complete removal of the plug before release of any residual pressure within the system. An axially extending groove is formed in the threaded portion of an elongated shank of the plug and terminates in an unthreaded area of the shank adjacent to an enlarged head of the plug. An O-ring is compressed against the pressurized vessel or container when the plug is fully sealed in the threaded opening. The end of the groove adjacent the plug head beings to vent any residual pressure trapped within the pressurized system upon partial unloosening of the plug to relieve pressure while a sufficient number of threads on the inner end of the shank remain engaged within the threaded opening to prevent the plug from being blown out of the hole by any residual pressure. In an alternate embodiment, an axial hole is formed through the center of the shank and communicates with a cross hole to provide the venting for the plug.

5 Claims, 3 Drawing Sheets

SAFETY DRAIN PLUG

BACKGROUND OF THE INVENTION

1. Technical Field

The invention relates to drain plugs and in particular to a drain plug for venting and relieving residual pressure in a pressurized system while a sufficient number of threads on the plug remain engaged to prevent the premature release of excess residual pressure or possible blow out of the plug to prevent injury to an operator.

2. Background Information

Various types of pressure systems such as those containing hydraulic fluids, hazardous liquids including radioactive liquids, expensive liquids and gases, as well as various high pressure gasses, steam and the like are provided with drain plugs for removing gas or liquid from the system for a variety of reasons.

Occasionally an injury to an operator can occur or the expensive liquid or gas can be lost should an operator remove the drain plug while residual pressure remains within the pressurized system. Occasionally the operator will begin to unscrew the drain plug from its threaded opening and upon nearing the end of the threaded shank, the residual pressure will "blow out" the drain plug, possibly striking the operator or causing injury as well as spraying various high temperature or toxic chemicals upon the operator or into the surrounding atmosphere.

Thus, the need exists for a drain plug which can be installed in a pressurized system which will ensure that the operator becomes aware of any residual pressure remaining in the system should he or she begin to unscrew the drain plug while such residual pressure remains in the system while sufficient threads of the drain plug are engaged within the threaded opening to prevent premature ejection or "blow out" of the plug.

Various types of check and relief valves have been devised in order to reduce or eliminate this problem. However, most of these valves are provided with some type of spring biased ball or detente member which upon movement of certain components of the valve, will bleed or vent gasses or liquids from various gauges, instruments, pressurized containers or the like. These devices will assist in preventing the accidental removal of the drain plug or check valve while sufficient pressurized gas or liquid remains in the system which could possibly injure the operator. Although these check and relief valves or purge valves provide a solution to the problem, they consist of several components which are always subject to maintenance and repair and are more expensive than desirable. Also they occupy additional space than a usual drain plug which can be a problem in certain pressurized systems where space is at a premium.

My invention provides for the safety of the operator by a very inexpensive drain plug which is free of any moveable parts and requires only the formation of a hole or groove throughout the threaded shank portion of the plug, and which provides for the partial venting of the pressurized fluid upon partial unloosening of the drain plug.

SUMMARY OF THE INVENTION

Objectives of the invention include providing a safety drain plug which relieves pressure through a slot or hole in the plug while there are still sufficient threads of the plug engaged with the threaded opening of the pressurized system to prevent the plug from "blowing out" and injuring operating personnel.

A further objective of the invention is to provide such a drain plug which modifies a usual drain plug, forming a groove or hole therein, eliminating the need for specially constructed valves. These specially constructed valves as heretofore used are of several types such as spring biased members, rotating plugs with cross-drilling for venting, and needle valves with screwed stem against valve seat. These valves have moving parts which are subject to wear and breakage and are considerably more expensive.

Still another objective of the invention is to provide such a drain plug which is readily adaptable for use with usual types of sealing O-rings; in which the plug does not effect its manner of installation or removal from the pressurized system; and in which the plug can be used as an interchangeable replacement for conventional threaded plugs.

A still further objective of the invention is to provide such a drain plug which is economically attractive and able to fit into a small space in contrast to heretofore purge valves and needle valves which are larger due to the space requirement for the moving parts therein; and in which the plug can easily be marked on its head with a symbol to identify its size and/or purpose.

Still another objective of the invention is to provide such a safety drain plug which can be formed of various materials in order to be compatible with the gas or liquid contained within the pressurized system; and which most importantly will alert an operator of the presence of residual pressure within the system, prior to subjecting the operator and surrounding personnel with possible injury and loss of hazardous or expensive liquids and gasses contained within the system.

These objectives and advantages are obtained by the improved safety drain plug of the invention, the general nature of which may be stated as including shank having a head at one end and an externally threaded portion spaced from the head by a smooth unthreaded portion of the shank; an annular sealing ring located about the smooth unthreaded portion of the shank for sealing engagement against the pressurized member when the plug is fully threadably engaged in the threaded opening; and groove means formed in and extending generally axially along the majority of the shank and terminating in an outlet end located generally adjacent the head and sealing ring and between said sealing ring and the majority of the threaded portion of the shank so that when the plug is partially unscrewed from the threaded opening the outlet end of the groove means starts venting pressure from within the pressurized member while an end of the threaded portion remains engaged with the internally threaded opening to prevent premature ejection of the plug from the threaded opening by any residual pressure in the pressurized member.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
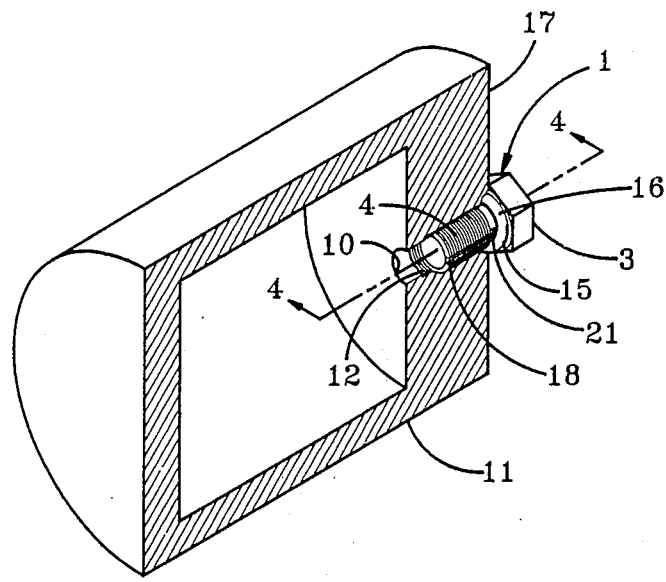
FIG. 1 is a diagrammatic perspective view showing the improved drain plug mounted in the threaded opening of a pressurized vessel.
Figure 2:
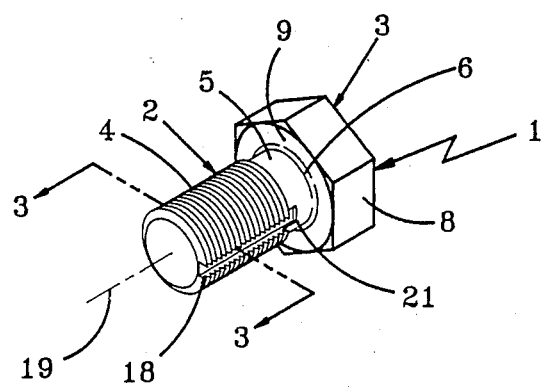
FIG. 2 is an enlarged perspective view of the improved drain plug.

The improved safety drain plug of the invention is indicated generally at 1, and is shown particularly in FIG. 2. Plug 1 includes a shank and a head indicated generally at 2 and 3, respectively. Shank 2 is a generally cylindrical shaped solid body having a threaded lower portion 4 and an unthreaded portion 5 which merges with head 3 by a radius portion 6. Plug head 3 includes a body 8 having either a multi-sided configuration as shown in the drawings or a solid cylindrical head with a hexagonal cavity for receiving a tool for tightening and loosening the thread, and has a shoulder 9 at the junction with radius portion 6. Preferably threaded portion 4 is a straight thread used to plug usual straight threaded holes, such as hole 10 formed in a pressurized vessel 11 or formed in a conduit or other component of a pressurized system. Threaded hole 10 is formed with an internal thread 12 for receiving threaded portion 4 of plug 1 in a usual sealing manner.

A sealing O-ring 15 formed of a resilient material is located about unthreaded portion 5 of shank 2 so that when plug 1 is fully seated in threaded hole 10, it is pressed within a countersink 16 formed at the opening of hole 10, or when used for low pressure applications, i.e. 1000 psi or less, it will be pressed against outer wall 17 which surrounds hole 10 if no countersink is present.

The above description of plug 1 and threaded hole 10 of vessel 11 is the usual construction found for a vast number of drain plugs and the threaded openings or holes in which they are mounted.

Figure 3:
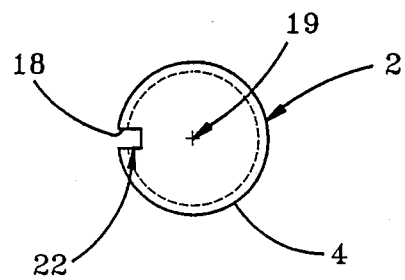
FIG. 3 is an enlarged horizontal sectional view taken on line 3—3, FIG. 2.

In accordance with the invention, a groove or recess 18 is formed in threaded portion 10 and extends generally, axially along and parallel to central axis 19 of shank 2. Groove 18 terminates in an outlet end 21 preferably within unthreaded portion 5. Groove 18 has a depth of only a faction of an inch sufficiently to extend slightly inwardly beyond the root of the threads in threaded portion 4, and thus does not materially effect the strength of the bolt. As shown in FIG. 3, this depth beneath the thread root is indicated at 22 and stops considerably short of the center of the threaded shank.

Figure 4:
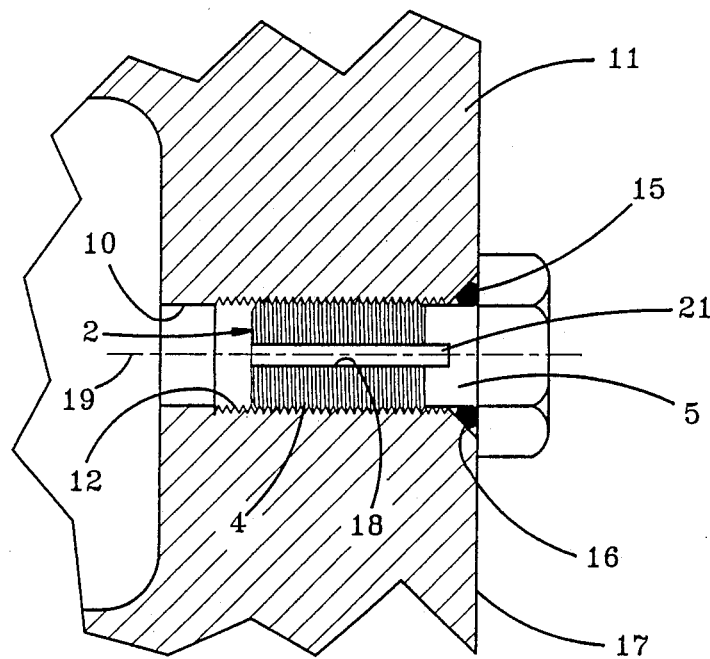
FIG. 4 is an enlarged sectional view of the drain plug seated within the threaded drain opening taken on line 4—4, FIG. 1.
Figure 5:
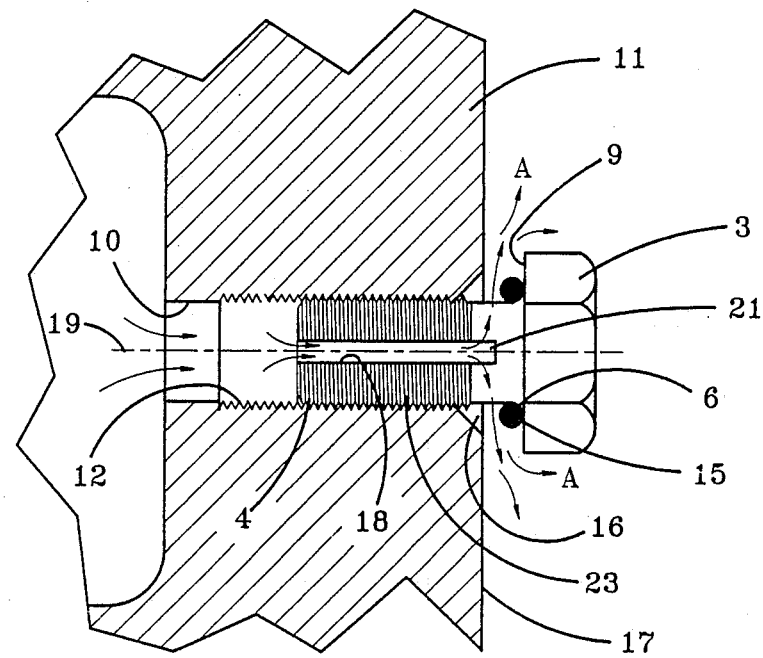
FIG. 5 is a view similar to FIG. 4 with the plug shown partially seated within its threaded opening and the slot partially exposed for venting any residual pressure.

The manner of operation of safety plug 1 is best understood by referring to FIGS. 4 and 5. Referring to FIG. 4, when bolt 1 is fully seated within threaded hole 10, bolt head shoulder 9 will compress O-ring 15 either in countersink 16 or tightly against outside surface 17 of vessel 11 should no countersink be provided with threaded portion 4. The engagement of threaded portion 4 with the hole threads provide sufficient sealing with O-ring 15 providing the sealing for the small amount of fluid bypassing the threads through groove 18.

Referring to FIG. 5, upon an operator partially unscrewing plug from within hole 10, it will unseat and unseal O-ring 15 from its sealing engagement with vessel 11 thereby permitting any residual pressure to flow through groove 18 and outwardly through groove outlet end 21 and past the unseated O-ring as shown by arrows A. This partial release of pressure will immediately alert the operator that pressure still remains in the vessel while sufficient threads as shown by area 23, remain engaged within threaded hole 10 to prevent the "blow out" of the plug from the hole, until the operator has released or considerably reduced the pressure remaining within the vessel. It is not uncommon that these vessels can contain pressures between 3,000 and 5,000 psi for regular petroleum based hydraulic fluids. For other pressurized vessels and systems this amount can be even considerably greater.

Figure 6:
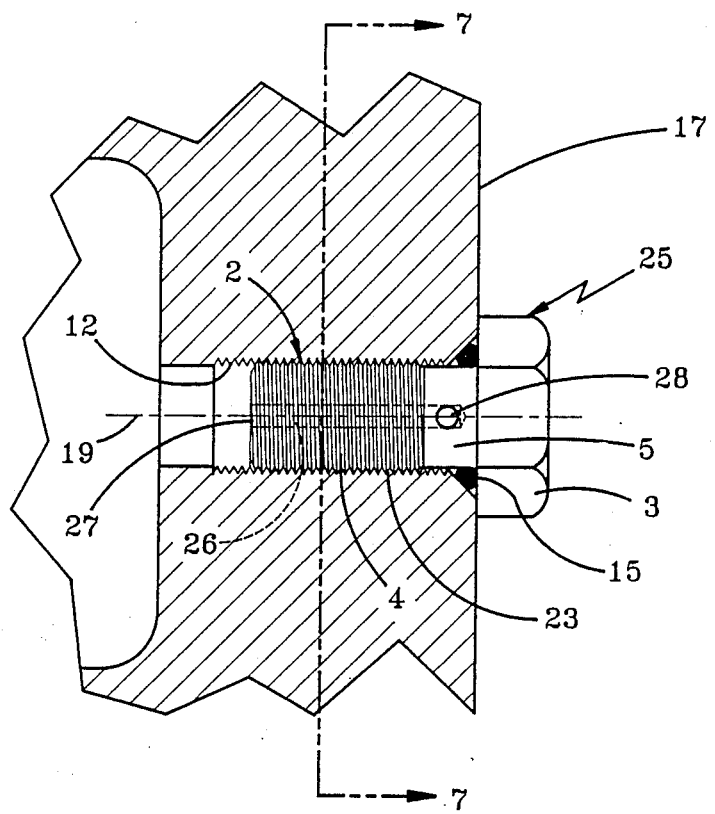
FIG. 6 is a sectional view similar to FIG. 4 showing a second embodiment of the improved safety drain plug.
Figure 7:
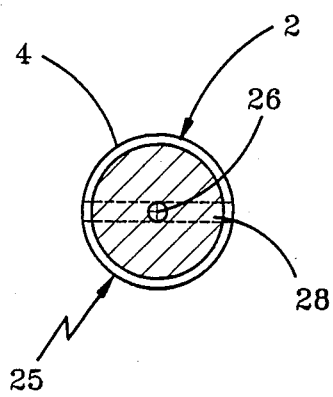
FIG. 7 is a cross sectional view taken on line 7—7, FIG. 6.

A modified form of the safety drain plug is indicated generally at 25, and is shown in FIGS. 6 and 7. Plug 25 is similar to plug 1 discussed above, with the exception that external groove 18 is replaced with an axially located central hole 26 which extends along the center of the shank and is open at its lower end 27, with its outlet end 28 being formed by a cross drilled hole which communicates with central hole 26.

The operation of modified drain plug 25 is the same as that of plug 1 described above in that when it is fully seated as shown in FIG. 6, the majority of the sealing effect is provided by threaded portion 4, with any leakage around the threads and through hole ends 27 and 28 being blocked by O-ring 15. Again, upon partial unscrewing of plug 25 from within hole 10, the pressurized gas or fluid will flow through hole ends 27 and 28 and outwardly past O-ring 15, alerting the operator of the residual pressure within the pressurized system.

Again, hole 26 will have a relatively small diameter as compared to the diameter of threaded shank 23, with outlet end 28 being approximately the same size so that only a small amount of gas or liquid will flow therethrough to reduce the amount of sealing required by O-ring 15 and to reduce the amount of gas or liquid which is ejected around the O-ring upon partial unscrewing of the threaded plug from threaded opening 10.

Although the plug could have a tapered thread, it is believed to perform most satisfactorily with a straight thread, which is the standard thread used on most drain plugs. Likewise, it is easily seen that groove or hole configurations could be devised other than those of groove 18 and holes 26, without effecting the concept of the invention. However, a uniform hole of minimum size has been found to be the preferred configuration.

Accordingly, the improved safety drain plug is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved safety drain plug is constructed and used, the characteristics of the construction, and the advantageous, new and useful results obtained; the new and useful structures, devices, elements, arrangements, parts and combinations, are set forth in the appended claims.

I claim:

1. In combination, a safety drain plug for threaded removable engagement within an internally threaded cylindrical opening of a pressurized member, said plug including a cylindrical shank having a head provided with tool engaging flat side surfaces at one end, and an externally threaded cylindrical portion spaced from the head by a smooth unthreaded portion; an annular elastomeric sealing ring located about the smooth unthreaded portion of the shank for sealing engagement within an annular countersink surrounding the threaded opening of the pressurized member when the plug is fully threadably engaged in the threaded opening; and a single external groove formed in and extending generally axially along the majority of the shank and terminating in an outlet end located generally adjacent to the head and sealing ring and between said sealing ring and the majority of the threaded portion so that when the plug is partially unscrewed from the threaded opening of the pressurized member while a portion of the outlet end of the groove a portion of the shank and a portion of the sealing ring yet remain within the annular countersink to start venting pressure from within the pressurized member while a major portion of the threaded portion remains engaged with the internally threaded opening to prevent premature ejection of the plug from the threaded opening by any residual pressure in the pressurized member before complete removal of the plug from the pressurized member.

2. The combination defined in claim 1 in which the outlet end of the groove is located in the smooth unthreaded portion of the shank.

3. The combination defined in claim 1 in which the unthreaded shank portion has an outwardly curved portion terminating at the head.

4. In combination, a safety drain plug for threaded complete removable engagement within an internally threaded cylindrical opening of a pressurized member, said plug including a cylindrical shank having a head provided with tool engaging flat side surfaces at one end and an externally threaded cylindrical portion spaced from the head by a smooth unthreaded portion; an annular elastomeric sealing ring located about the smooth unthreaded portion of the shank for sealing engagement within an annular countersink surrounding the threaded opening of the pressurized member when the plug is fully threadably engaged in the threaded opening; and a first hole formed in and extending axially along the center of the shank and terminating in a second hole extending transversely completely through the shank, said second hole terminating in a pair of dramatically spaced outlet ends located generally adjacent to the head and sealing ring and between said sealing ring and the majority of the threaded portion so that when the plug is partially unscrewed from the threaded opening while a portion of the outlet ends of the second hole a portion of the shank and a portion of the sealing ring yet remain within the annular countersink to start venting pressure from within the pressurized member while a major portion of the threaded portion remains engaged with the internally threaded opening to prevent premature ejection of the plug from the threaded opening by any residual pressure in the pressurized member before complete removal of the plug from the pressurized member.

5. The combination defined in claim 1 in which the pressurized member contains a pressurized fluid exerting a pressure greater than 3000 psi.

* * * * *